(12) United States Patent
Hocker et al.

(10) Patent No.: US 10,934,028 B2
(45) Date of Patent: Mar. 2, 2021

(54) IN-SITU PASSIVATION AND INSULATION LAYER FOR A FLEXIBLE THERMAL PROTECTION SYSTEM (FTPS)

(71) Applicant: UNITED STATES OF AMERICA AS REPRESENTED BY THE ADMINISTRATOR OF NASA, Washington, DC (US)

(72) Inventors: John-Andrew S. Hocker, Newport News, VA (US); Cheol Park, Yorktown, VA (US); Sang-Hyon Chu, Yorktown, VA (US); Jin Ho Kang, Newport News, VA (US); Catharine C. Fay, Yorktown, VA (US)

(73) Assignee: U.S.A. as represented by the Administrator of the National Aeronautics and Space Administration, Washington, DC (US)

( * ) Notice: Subject to any disclaimer, the term of this patent is extended or adjusted under 35 U.S.C. 154(b) by 648 days.

(21) Appl. No.: 15/813,997

(22) Filed: Nov. 15, 2017

(65) Prior Publication Data
US 2018/0134418 A1      May 17, 2018

Related U.S. Application Data

(60) Provisional application No. 62/422,275, filed on Nov. 15, 2016.

(51) Int. Cl.
*B64G 1/62*      (2006.01)
*C01B 21/064*    (2006.01)
*B64G 1/22*      (2006.01)

(52) U.S. Cl.
CPC .............. *B64G 1/62* (2013.01); *C01B 21/064* (2013.01); *B64G 2001/224* (2013.01); *C01P 2004/13* (2013.01); *C01P 2006/37* (2013.01)

(58) Field of Classification Search
CPC ...................................................... B64G 1/62
See application file for complete search history.

(56) References Cited

U.S. PATENT DOCUMENTS

| 4,504,031 A | * | 3/1985 | Andrews | B64G 1/62 244/110 D |
| 4,518,137 A | * | 5/1985 | Andrews | B64G 1/62 244/110 D |

(Continued)

OTHER PUBLICATIONS

Natali, M., Rallini, M., Puglia, D., Kenny, J. & Torre, L. An Armadillo-Like Flexible Thermal Protection System for Inflatable Decelerators: A Novel Paradigm, Macromolecular Materials and Engineering vol. 299, pp. 379-390, doi:10.1002/mame.201300267 (2014).

(Continued)

*Primary Examiner* — Justin M Benedik
(74) *Attorney, Agent, or Firm* — Jennnifer L. Riley; Robin W. Edwards; Helen M. Galus (57) ABSTRACT

A lightweight flexible BNNT mat or fabric provides improved thermal stability and shielding capabilities under a hypersonic thermal flux. The BNNT mat reduces the stagnation temperature and maintains a low regression rate. An in-situ passivation layer may be formed on the BNNT mat or fabric under high thermal flux. The passivation layer minimizes or prevents penetration of the atmosphere (air or gas) as well as heat and radiation through the thickness of the BNNT material, and it effectively diffuses heat throughout the mat or fabric laterally and radially to minimize localized excessive heat. A BNNT mat according to the present disclosure may also efficiently transfer heat from the BNNT material via radiation due to the high thermal emissivity (0.92) of the BNNT material.

20 Claims, 10 Drawing Sheets

(56) References Cited

U.S. PATENT DOCUMENTS 6,264,144 B1 * 7/2001 Thornton ................ B64G 1/58
  244/113
2012/0186742 A1 * 7/2012 Kang ........................ B32B 5/26
  156/324

OTHER PUBLICATIONS

Chen, Y., Zou, J., Campbell, S. J. & Le Caer, G. Boron nitride nanotubes: Pronounced resistance to oxidation, Applied Physics Letters vol. 84, pp. 2430-2462, doi:10.1063/1.1667278 (2004).

* cited by examiner

IN-SITU PASSIVATION AND INSULATION LAYER FOR A FLEXIBLE THERMAL PROTECTION SYSTEM (FTPS)

CROSS-REFERENCE TO RELATED PATENT APPLICATION

This patent application claims the benefit of and priority to U.S. Provisional Patent Application No. 62/422,275, filed on Nov. 15, 2016, titled "In-situ Passivation and Insulation Layer for a Flexible Thermal Protection System (FTPS)" the contents of which is hereby incorporated by reference in its entirety.

STATEMENT REGARDING FEDERALLY SPONSORED RESEARCH OR DEVELOPMENT

The invention described herein was made in the performance of work under a NASA contract and by employees of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

BACKGROUND OF THE INVENTION

Advanced lightweight flexible structural materials that can repeatedly and reliably perform at high temperatures are crucial for many applications. Such materials are crucial to enable future planetary human exploration missions. Previous research has shown the potential of boron nitride and boron nitride nanotubes (BNNTs) as robust materials to withstand extreme thermal conditions. In general, boron nitride is stable up to about 800° C. in air and about 2700° C. in an inert atmosphere. A known structural lightweight material for thermal protection is Phenolic Impregnated Carbon Ablator (PICA) with a density of 0.27 g/cm$^3$. PICA and similar materials (e.g. AVCOAT) are very brittle, not flexible, and the oxidation temperature is less than 450° C. in air. This limits use of these materials to rigid structures used in non-extreme thermal conditions.

For Hypersonic Inflatable Aerodynamic Decelerator (HIAD) entry, descent and landing (EDL) concepts, a flexible thermal protection system (FTPS) is under development to shield a 40-ton craft from the high aerothermal flux of atmospheric entry, descent and landing. A deployable FTPS must be capable of shielding against the high aerothermal flux of reentry and mechanically robust to withstand high density packing and deployment.

Prior FTPS layups that have been designed are complex, non-flexible, multi-layered systems. For example, a 4 material layup consisting of Nextel 440 BF-20 (alumina-boria-silica fiber ceramic fiber), Pyrogel 3350 (non-woven glass fiber reinforced silica aerogel), Kapton (polyimide film), and Kevlar has been used for FTPS. Determining how the FTPS will behave during EDL becomes more complicated with each additional material layer. Furthermore, existing FTPSs are difficult to adapt for various deployable space vehicles.

BRIEF SUMMARY OF THE INVENTION

One aspect of the present disclosure is a method of providing a thermal barrier. The method includes positioning a layer of material comprising boron nitride nanotubes (BNNT) adjacent at least a portion of a surface to be shielded from thermal energy, whereby, in use, at least a portion of a surface of the layer of material forms boron oxide or boron carbide, or boron oxide and boron carbide, to provide one or more of in-situ heat passivation and/or a gas barrier when the layer of material is exposed to a high temperature gas. The layer of material may comprise a mat, and the layer of material may comprise an elemental resource such as nitrogen and/or carbon particles that react with the BNNT of the mat when the layer of material is exposed to a high temperature gas or a thermal load of greater than about 300° C., greater than about 500° C., or greater than about 800° C. The elemental resource may be disposed in the BNNT adjacent a surface thereof whereby the elemental resource reacts with the BNNT to form a refractory material such as a ceramic. The layer of material may comprise a BNNT mat having a thickness of about 0.5 mm to about 20 mm, and the BNNT mat may have a density of about 0.15 g/cm$^3$ to about 1.7 g/cm$^3$, or from about 0.15 g/cm$^3$ to about 2.52 g/cm$^3$. The layer of material may be attached to a space vehicle to provide thermal shielding for atmospheric reentry. The layer of material may be utilized to form an inflatable structure that forms a thermal shield for atmospheric re-entry of space vehicles.

Another aspect of the present disclosure is a method of providing aerothermal shielding of space vehicles during planetary re-entry and descent. The method includes providing at least one layer of a flexible aerothermal shielding material comprising a non-woven mat of boron nitride nanotubes (BNNT). A hypersonic inflatable aerodynamic decelerator (HIAD) is formed from the non-woven mat of BNNT, and the HIAD is secured to a space vehicle. The HIAD is configured to be deployed prior to, or during, planetary re-entry and descent of the space vehicle.

Another aspect of the present disclosure is a method of providing a thermal barrier. The method includes positioning a layer of material comprising boron nitride nanotubes (BNNT) adjacent at least a portion of a surface to be shielded from thermal energy, whereby, in use, at least a portion of a surface of the layer of material forms a refractory material comprising a compound of boron and one or more additional elements when the layer of material is exposed to a high temperature. The refractory material that is formed may comprise a ceramic. In particular, the refractory material may comprise boron oxide and/or boron carbide. The layer of material may comprise a mat, and the layer of material may include an elemental resource that reacts with the BNNT when the layer of material is heated.

These and other features, advantages, and objects of the present invention will be further understood and appreciated by those skilled in the art by reference to the following specification, claims, and appended drawings.

DETAILED DESCRIPTION OF THE INVENTION

Figure 1:
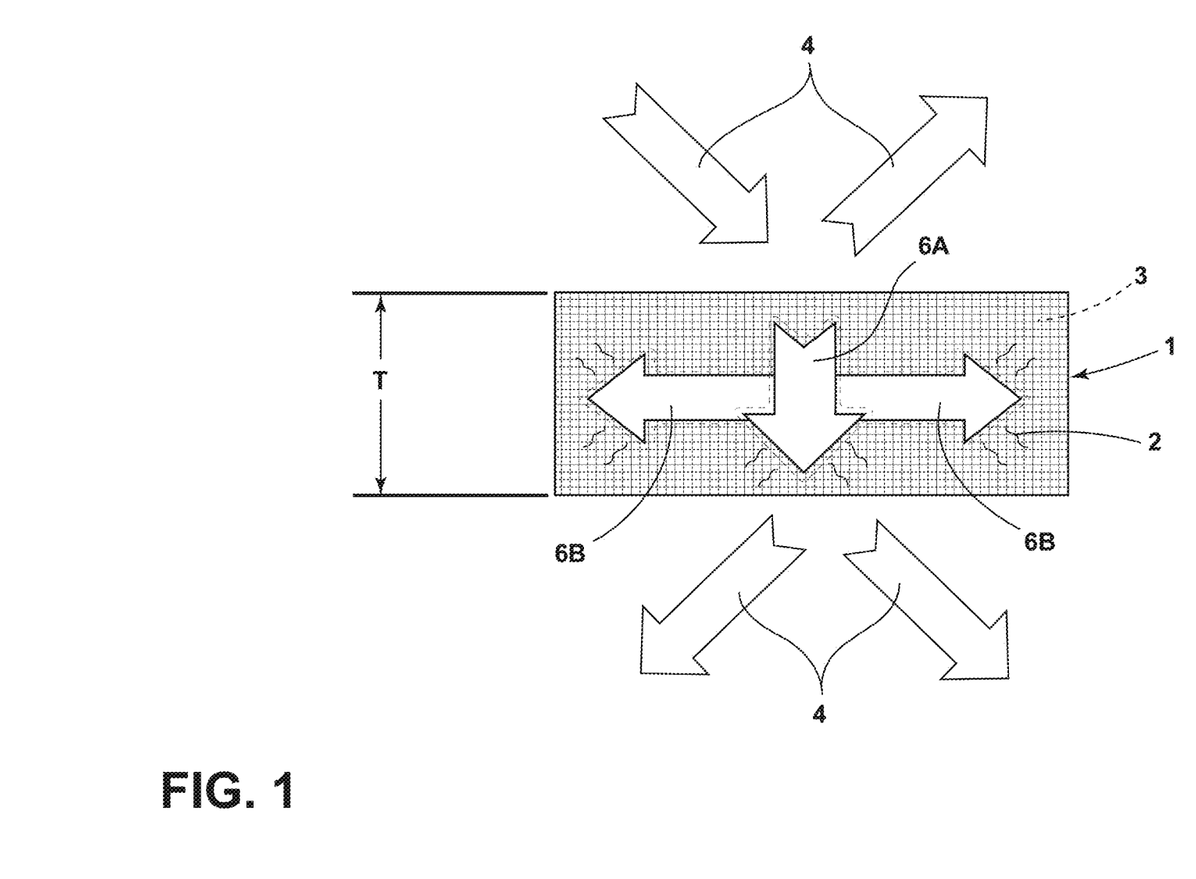
FIG. 1 is a schematic cross-sectional view of a Boron Nitride Nanotube (BNNT) mat according to one aspect of the present disclosure showing thermal conduction and radiation through the BNNT mat.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

One aspect of the present disclosure is a novel lightweight flexible BNNT mat (FIG. 1). As discussed in more detail below, BNNT mat 1 is an excellent flame retardant material and testing has demonstrated that the BNNT mat 1 has excellent thermal stability and shielding capabilities under a hypersonic thermal flux test in air. The properties of BNNT mat 1 minimize the stagnation temperature and keep the regression rate low. The novel BNNT mat or fabric creates an in-situ passivation layer 8 (FIG. 5) under high thermal flux. Layer 8 minimizes penetration of the atmosphere (air or gas), as well as, the penetration of heat and radiation through the thickness of mat 1. Layer 8 also diffuses heat 6A, 6B (FIG. 1) throughout the mat or fabric laterally and radially to minimize localized excessive heat. In addition, the lightweight flexible BNNT mat 1 of the present disclosure can efficiently alleviate/transfer heat via radiation because of its high thermal emissivity (0.92).

As discussed in more detail below in connection with FIGS. 5-14, the BNNT mat 1 of the present disclosure offers a lightweight, simple, single layer BNNT FTPS with improved thermal protection and flame retardation performance in extreme environments while providing structural robustness. The novel BNNT materials can also serve as flame retardants and flame retardant additives in composite systems.

Figure 12:
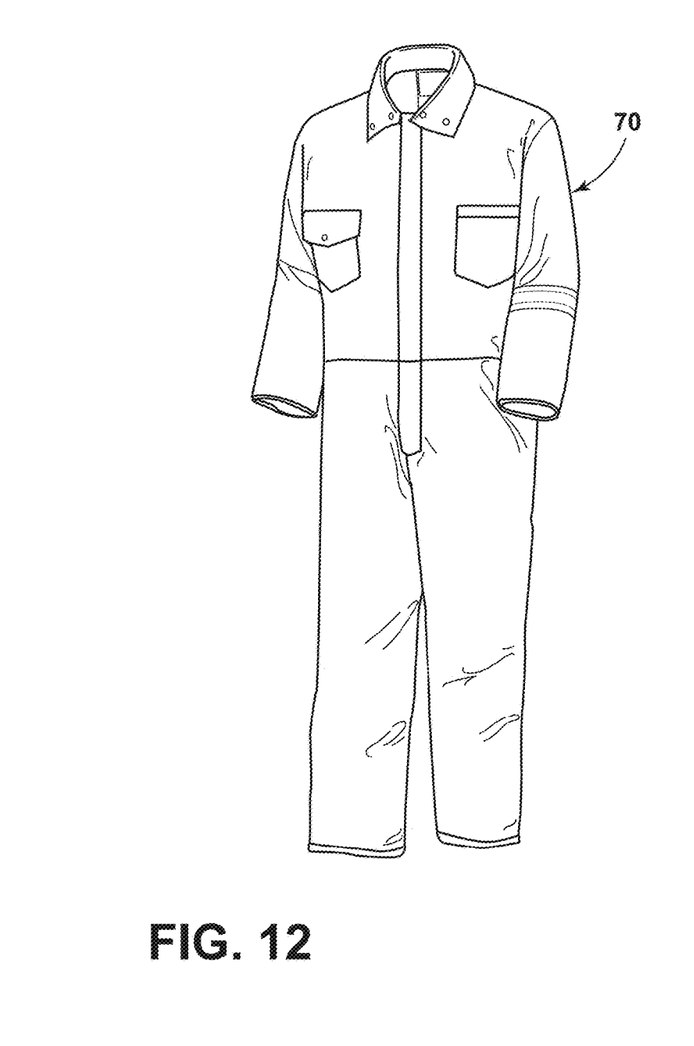
FIG. 12 shows a protective cover/suit for firefighters and/or nuclear plant workers including a flexible BNNT mat material according to another aspect of the present disclosure.

The BNNT mat of the present disclosure may be utilized in an ultralight flexible shielding system for numerous space missions as well as a wide range of industry and daily-life applications. The novel BNNT mat 1/shielding system may be utilized in an advanced FTPS (FIG. 2) for tension shell designs as well as various extreme-environment applications. The BNNT 1 mat may be utilized to provide conformal insulation for cryogenic propulsion systems, next-generation space suits, inflatable space habitats, and other such aerospace applications. For military and industry applications, the BNNT mat 1 provides a lightweight flexible thermal/radiation shielding (including fire-resistant insulation) for high power cables (FIG. 1), flame/fire retardant primary and secondary airframe structures (FIG. 9), and cabin spaces of commercial/military aircrafts (FIG. 9), thermal insulation for deep-water oil pipes, fire-radiation protective cover for firefighters and nuclear plant workers (FIG. 12). Furthermore, the BNNT may 1 of the present disclosure may be utilized to provide flame/fire retardant exterior and interior materials for infrastructures (buildings) and residential homes (FIG. 13), and other such structures.

With reference to FIG. 1, a BNNT mat 1 according to one aspect of the present disclosure includes a plurality of boron nitride nanotubes (BNNT) 2. In general, the BNNT are randomly oriented to provide a relatively dense, yet porous material. It will be understood that FIG. 1 is a schematic view, and the individual BNNTs 2 are not drawn to scale in FIG. 1. The BNNT mat 1 of the present disclosure may have a thickness of about 2 mm or more. In general, the BNNT mat 1 has a thickness "T" in the range of about 0.5-20 mm. However, the present disclosure is not limited to this range of thicknesses. The thickness of BNNT mat 1 is preferably significantly thicker than known BNNT "bucky paper." For example, known BNNT bucky paper may have a thickness on the order of about 100-500 mm.

Additional materials may be incorporated into the BNNT mat for carbon or nitrogen resources for in-situ refractory material formation with BNNT under thermal flux. For example, phenolic based resin can be directly absorbed into the BNNT mat by impregnation. Once impregnated, the phenolic resin can be cured to form a phenolic impregnated boron nitride heat shield. Other resins or elemental resources such as polyeitherimide, titanium or hafnium resources may be mixed with the BNNT in solvent and thereby incorporated into the mat.

The high strength and high thermal stability of BNNT mat 1 reduces the surface recession rate of thermal protection membranes and other structures fabricated from BNNT mat 1 under high heat flux. In addition, the high thermal emissivity (c) of BNNT materials also diminishes radiant heating. The high thermal conductivity of BNNT mat 1 facilitates thermal dissipation throughout structure fabricated from BNNT mat 1. The thermal emissivity of BNNT materials was recently measured as 0.92 along with calibration samples of black surface and gold surface. As illustrated in FIG. 1, the combination of excellent thermal properties of BNNT mat 1 enables the stagnation temperature of structures made from BNNT mat 1 to stay below thermal degradation temperature during missions under extreme environments. Additional benefits of BNNT-based shielding systems according to the present disclosure include (1) formation of boron oxide/carbide passivation layers 8 (FIG. 2) at high temperature process, which minimize penetration of heated atmosphere (air or gas) through the intact BNNT layer 1; and: (2) reduced surface heating due to endothermic recombination of BNNT derivatives. The boron passivation layer or layers 8 also provide "in-situ self-regeneration" of the protection layers during various missions at high temperatures. The effect of the endothermic recombination reduces surface heating by latent heat and lowers the operational temperature. The BNNT mat 1 can also serve as a flame retardant and flame retardant additive in composite systems.

Figure 2:
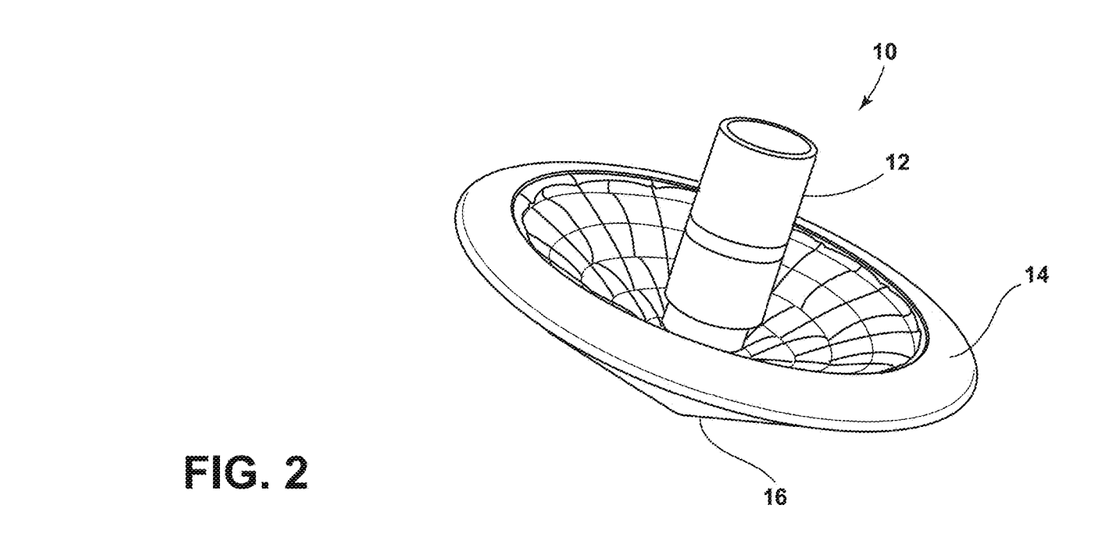
FIG. 2 is a partially schematic isometric view of a space craft including a Hypersonic Inflatable Aerodynamic Decelerator (HIAD) Flexible Thermal Protection System (FTPS) fabricated from a lightweight flexible BNNT mat according to one aspect of the present disclosure.

With further reference to FIG. 2, a spacecraft 10 may include a primary structure 12 and a deployable flexible thermal protection system (FTPS) 14. The FTPS 14 is deployed during reentry of spacecraft 10 into the atmosphere of a planet. The deployable FTPS may comprise a single layer of BNNT mat 1 having a thickness of about 2 mm. The BNNT mat 1 may have an exposed outer surface 16 that is subjected to conditions that are similar to that of the HYMETS test (FIG. 6B), such that the BNNT mat 1 of shield 14 forms a layer 8 (FIG. 2) during reentry of spacecraft 1. Shield 14 may be collapsed/folded into a stowed configuration (not shown) prior to being deployed to the configuration shown in FIG. 2. Shield 14 may be constructed to be stowed and deployed in a manner that is similar to known HIAD devices.

Figure 3:
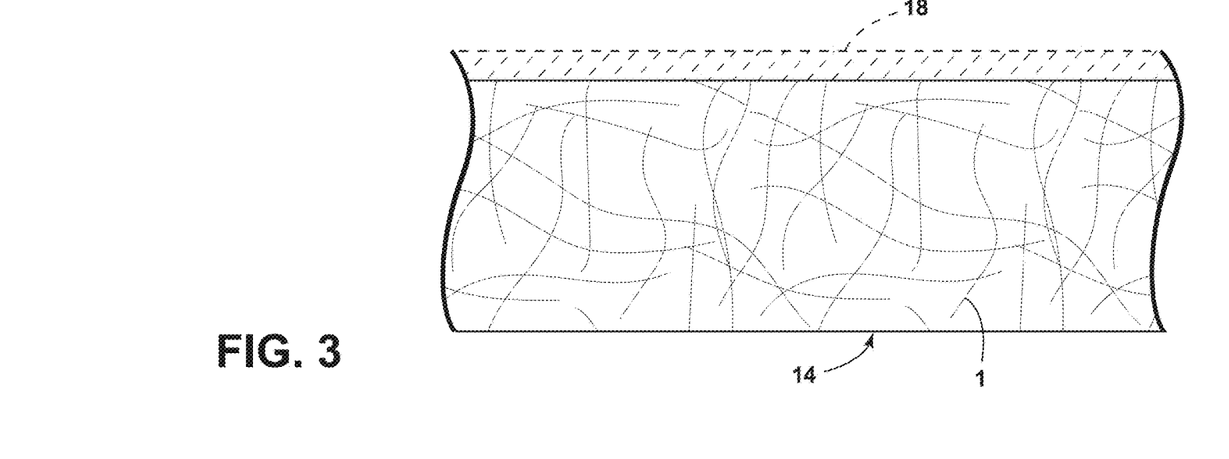
FIG. 3 is a cross sectional view of a portion of the FTPS of FIG. 2.
Figure 3A:
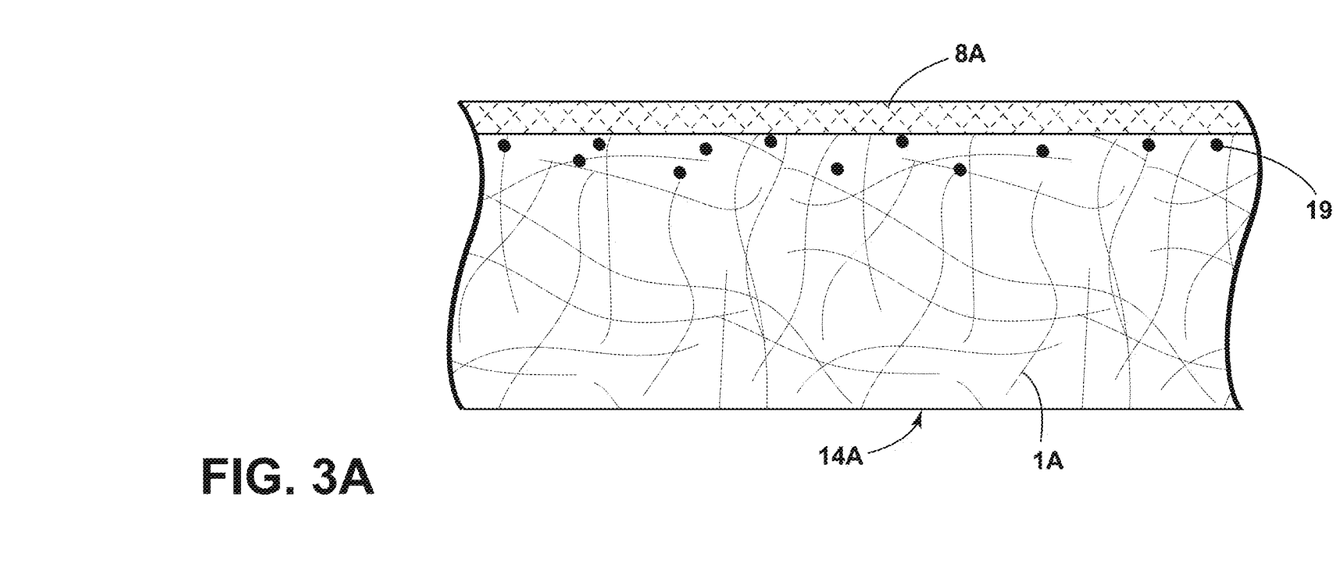
FIG. 3A is a cross sectional view of a BNNT mat material according to another aspect of the present disclosure.
Figure 4:
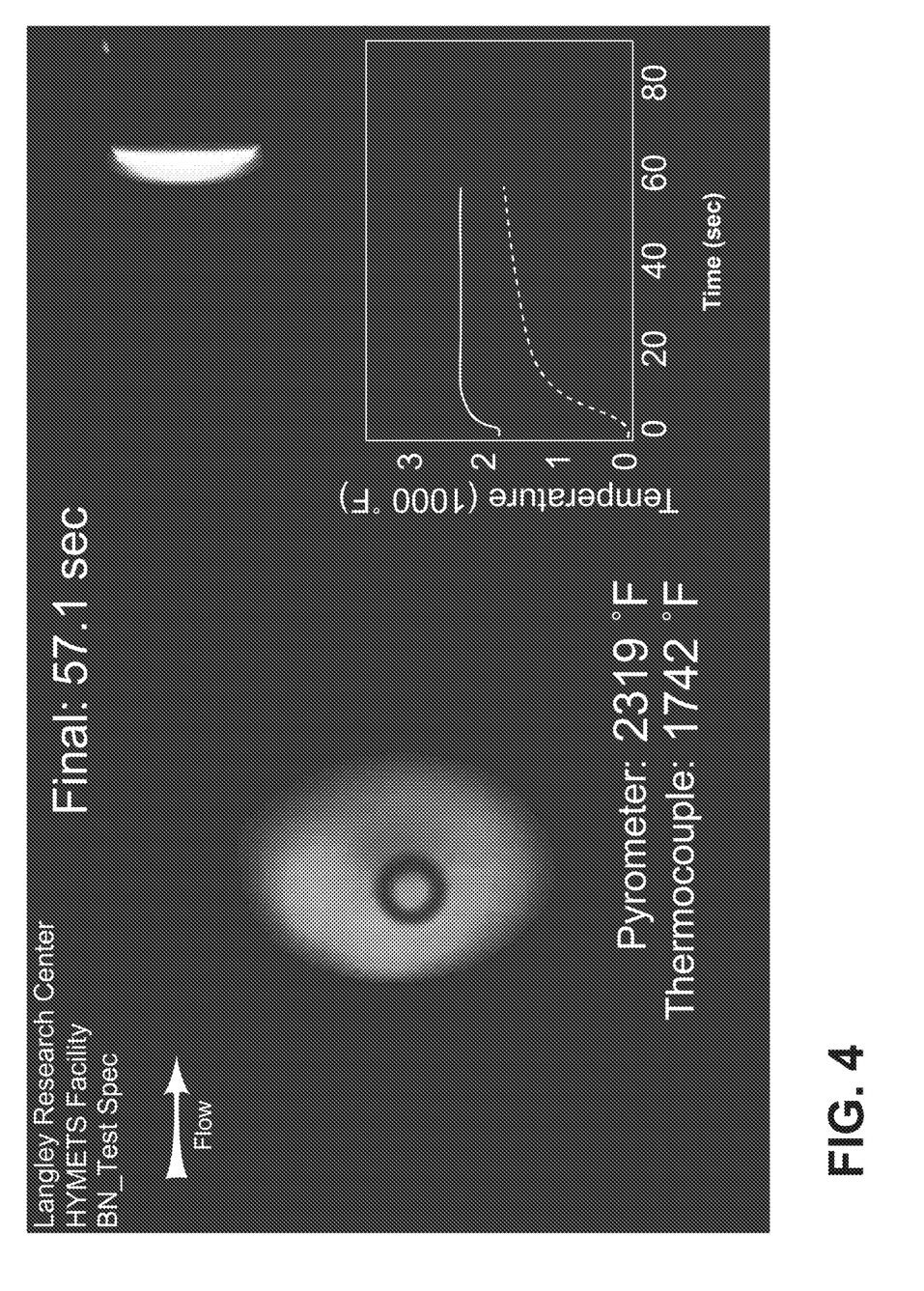
FIG. 4 is an image showing the results of a Hypersonic Materials Environmental Test System (HYMETS) test on a BNNT mat according to one aspect of the present disclosure.
Figure 5:
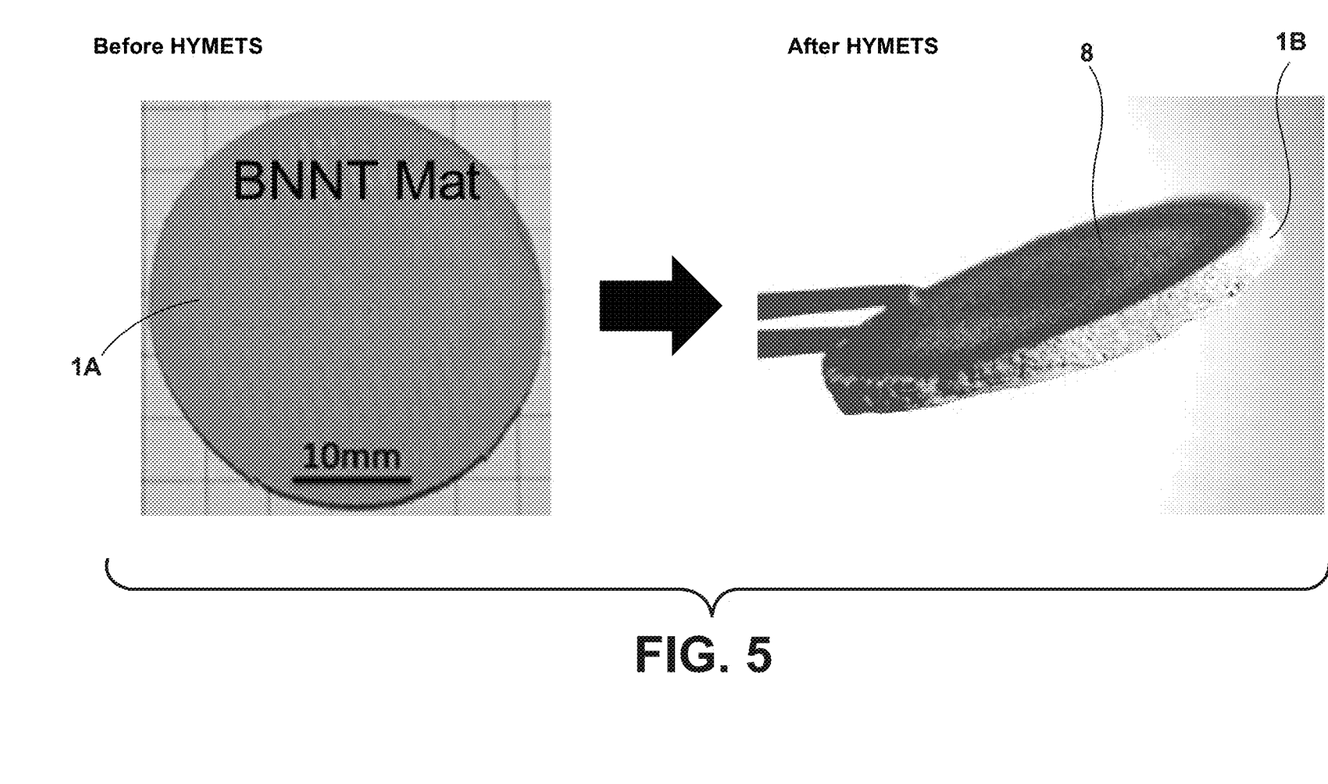
FIG. 5 is an image of a BNNT bucky disc before and after HYMETS testing.

With further reference to FIG. 3, the BNNT mat 1 of shield 14 may optionally include an inner layer 18. With further reference to FIG. 3A, a shield 14A according to another aspect of the present invention includes a BNNT mat 1A comprising BNNTs that are substantially similar to the BNNTs of FIG. 3. However, the FTPS 14A further includes carbon resources in the form of particles 19. The particles 19 may comprise carbon nanoparticles or another suitable form of carbon that is dispersed in the BNNT mat 1. When the FTPS 14A is exposed to high temperature conditions, a refractory layer 8A of boron carbide is formed due to reactions between the carbon particles 19 and the BNNT mat material 1. The particles 19 may comprise other materials such as titanium, hafnium, nitrogen, carbon, any combinations thereof or any other suitable materials. It will be understood that particles 19 may comprise more than one type of material to facilitate forming a refractory layer 8A of boron nitride, titanium nitride, and/or other materials, as required, for a particular application With reference to FIGS. 4 and 5, BNNT sample mats 1A ("BNNT bucky discs") were fabricated for testing. In FIG. 5, "1A" designates a sample BNNT bucky disk prior to HYMETS testing, and "1B" is a sample BNNT bucky disc after HYMETS testing.

Figure 6A:
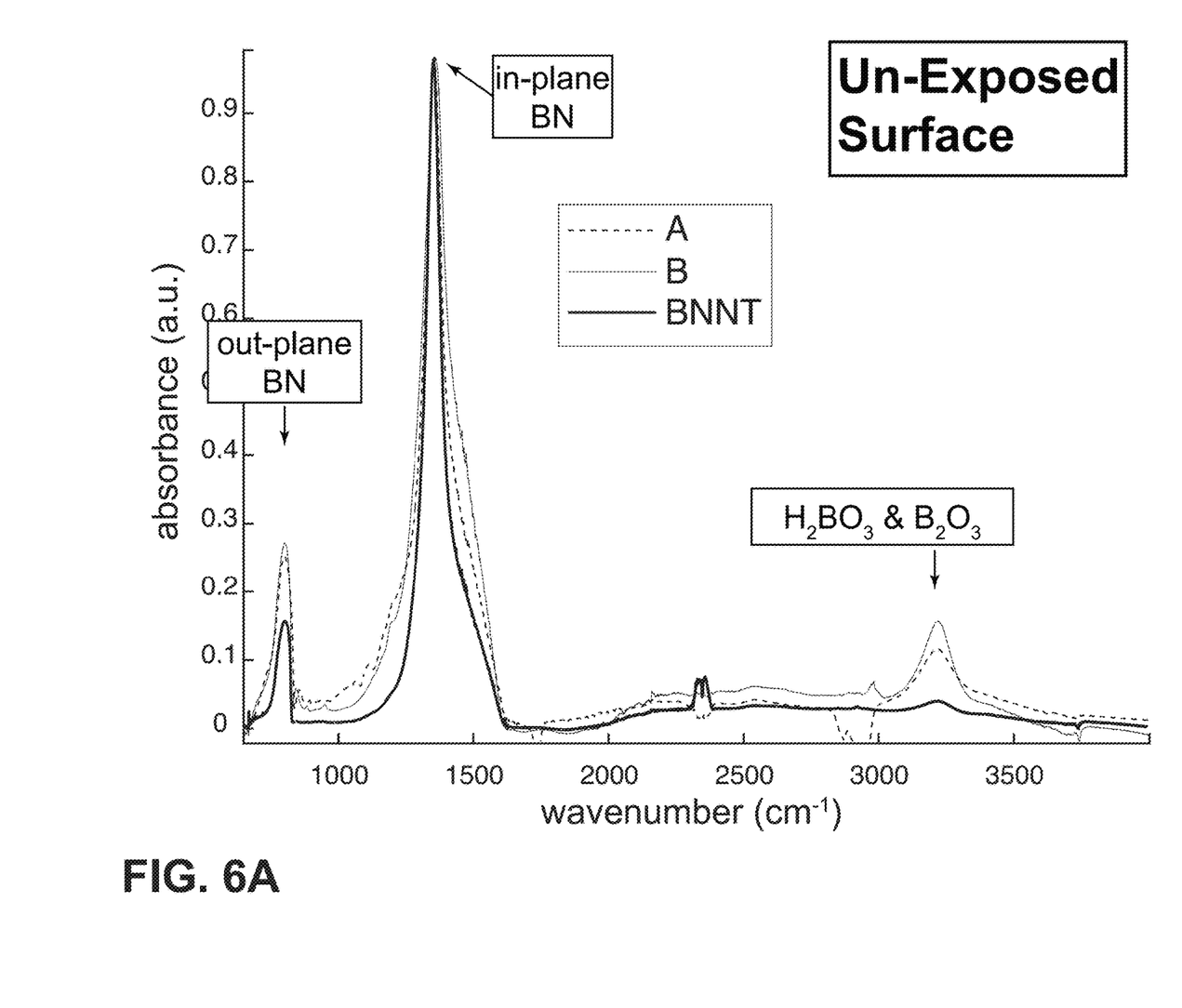
FIG. 6A shows infrared spectroscopy data for a HYMETS tested BNNT mat surface that was not exposed to HYMETS flux.
Figure 6B:
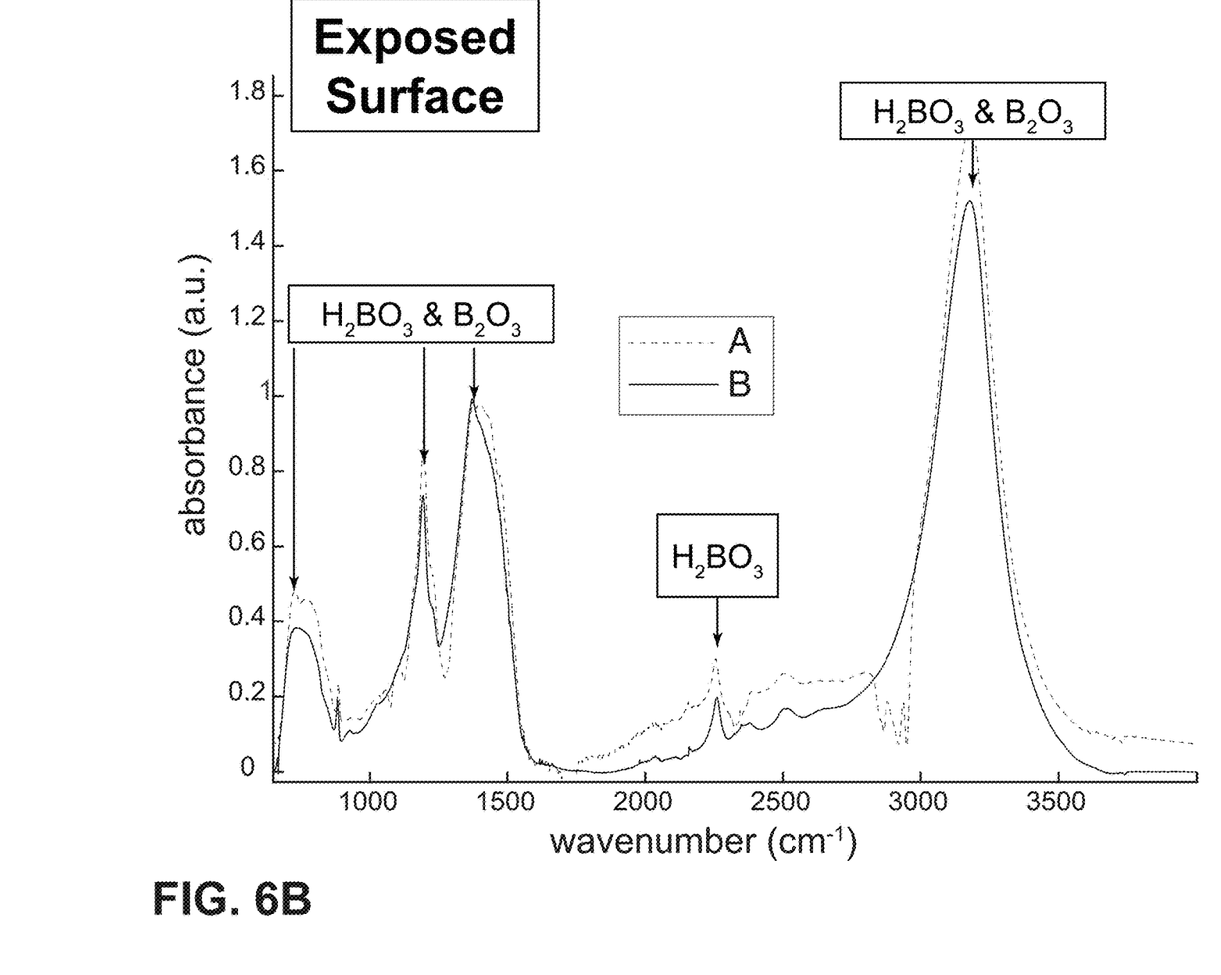
FIG. 6B shows infrared spectroscopy data of a HYMETS exposed BNNT mat surface.
Figure 7:
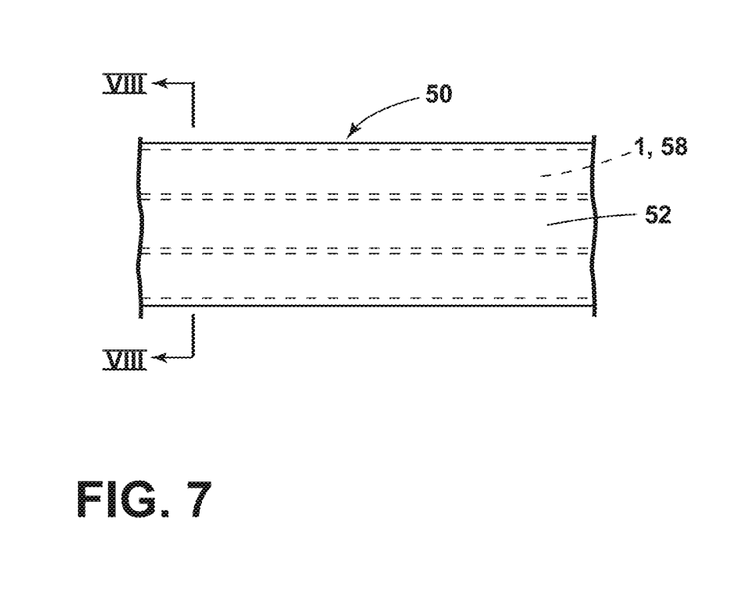
FIG. 7 is a fragmentary view of a high power electrical cable having a BNNT mat insulating layer according to another aspect of the present disclosure.
Figure 8:
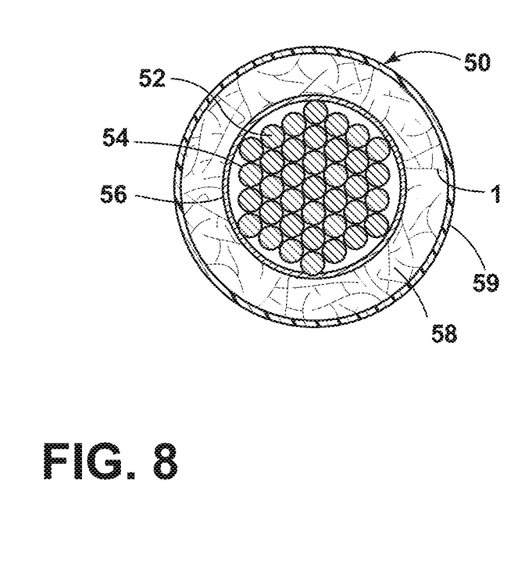
FIG. 8 is a cross sectional view of the electrical cable of FIG. 7 taken along the line VIII-VIII.

A Hypersonic Materials Environmental Test System (HYMETS) test was performed on several non-woven BNNT sample mats 1A. The HYMETS test is a high thermal flux planet entry simulation. A snapshot of a test run on a sample BNNT mat 1A is shown in FIG. 4, which exhibits real time thermal flux on the sample (side view top right), pyrometry image, and temperature profile of the front and back side of the sample 1A as a function of time. The BNNT mat survived with minimal damage on the exposed surface as seen in FIG. 5. Boron nitride nanotubes (BNNTs) oxidize and become a protective glassy boron oxide ($B_2O_3$) passivation layer 8 (FIG. 5) on the surface during aero-heat shielding. FIG. 6A shows SEM-EDX data for a surface of a sample mat 1A that was not exposed to HYMETS testing, and FIG. 6B shows SEM-EDX data for a surface of a sample mat 1A that has been exposed to HYMETS testing.

BNNTs have a high thermal oxidation temperature (about 800° C. in air), whereupon boron oxide and possibly boron carbide form from the BNNT-based material. The glassy boron oxide ($B_2O_3$) surface material 8 has a boiling point of 1860° C. and the boron carbide ($B_4C$) has a boiling point of 3500° C. On the surface of BNNT sample 1B, the in-situ self-regenerated $B_2O_3$ (or $B_4C$) passivation layer 8 effectively protects and stabilizes the rest of the intact BNNTs. In-situ self-regeneration of a glassy boron oxide or boron carbide surface 8 provides thermal passivation. The porosity of BNNT mat 1 and the high thermal emissivity allows for improved insulation during the 50 W/m$^2$ planetary entry simulation. Thus, although individual BNNTs have high thermal conductivity, a BNNT mat 1 according to the present disclosure may comprise a porous material, and the spaces between the individual BNNTs provides significant thermal insulation. Also, formation of the $B_2O_3$ material is an endothermic process which absorbs thermal energy and reduces the temperature of the BNNT mat 1 when exposed to reentry conditions.

The BNNT material itself of mat 1 exhibits flame retardant or extinguishing characteristics. In addition, it was found that addition of small amount of BNNT into a polymer matrix significantly enhanced the self-extinguishing (flame retardant) property of the polymer matrix material. During testing, a pristine polyimide sample was burnt in a flame of propane fuel (DOT-39, NRC 228/286 M1003) showing a bright flare that became extinguished in 0.34 seconds, after that sample was moved away from the flame. Compared to the pristine polyimide, the polyimide composite with 2 wt % BNNT showed a smaller flare in the fuel flame and self-extinguished in a shorter time of 0.24 seconds, which is about 40% improvement in the self-extinguishing property. Further, the 20 wt % of BN particle composite showed about 350% improvement in self-extinguishing property compared to its control polyimide.

A BNNT mat 1 according to the present disclosure may be utilized in place of known multi-material layup designs. The BNNT-based material is lightweight and deployable, with a low density between about 0.01 and about 1.3 g/cm$^3$ (typically 0.1-0.3 g/cm$^3$) that provides mass savings. The in-situ thermal passivation, insulation, and flexibility permit BNNT mat 1 to be utilized as a single material FTPS.

A single material FTPS (BNNT mat 1) according to the present disclosure is capable of:
  Replacing existing 4-layer FTPS with a simple single layer BNNT system.
  Providing mass savings of over 30% and higher density packing for smaller space vehicles compared to existing 4-layer FTPS.
  Eliminating or minimizing separate insulation and gas permeation barrier layers.
  Providing improved thermal performance by reducing radiant heating component. This is due to the higher thermal emissivity (0.92 measured) of BNNT, reduced recession rate of BNNT, and lower stagnation temperature by producing an in-situ self-regenerated passivation insulation layer.
  Provides neutron radiation shielding.

Furthermore, BNNTs can be formed into a thermal shielding yarn, fabric, and systems. The BNNT materials can serve as in-situ thermal passivation, flame retardation, and insulation layer. The in-situ self-regenerated thermal passivation layer 8 (FIG. 5) minimizes atmosphere penetration, reduces the thermal regression rate, and reduces/minimizes the stagnation temperature. The non-woven BNNT fabric or BNNT system of the present disclosure may have a density in the range of about 0.01 to about 1.3 g/cm³. However, the density of BNNT mat 1 may be about 0.2-0.3 g/cm³ for typical applications. The non-woven BNNT mat 1 is flexible and can withstand a greater than 1% strain. Still further, a flame retardant composite material may be fabricated by adding BNNTs or BN nanoparticles to matrix material (e.g. a thermosetting polymer material) in the concentration range of 0 to 100%. As discussed in more detail below in connection with FIGS. 9 and 10, aerospace primary and secondary structures can be fabricated with flame retardant BNNT composites.

Referring again to FIGS. 2 and 3, the BNNT-TPS material technology of the present disclosure may be utilized to provide a less complex architecture by utilizing a single layer BNNT based FTPS (BNNT mat 1) rather than a multi-layer construction. BNNTs are low weight with excellent mechanical durability, high thermal stability, emissivity and conductivity, and provide RF signal transparency. Additionally, when the BNNTs are formed into a porous non-woven mat 1, the bucky material exhibits a thermal conductivity of less than 0.24 W/(m*K) at 1260° C. In a FTPS (e.g. FIG. 2), the BNNT mat 1 may provide a greater than 30% weight savings with increased performance and higher density packing in the stowed configuration (not shown) to meet the requirements for smaller space vehicles. The BNNT mat 1 also provides improved thermal performance by reducing the radiant heating component due to the high emissivity of the material. BNNT mat 1 also reduces the recession rate in re-entry conditions of spacecraft 10. BNNT mat 1 also exhibits insulating behavior due to the low thermal conductivity of BNNT mat 1. A woven BNNT material formed from BNNT yarns may also be utilized in the applications discussed below in connection with FIGS. 7-14.

Figure 9:
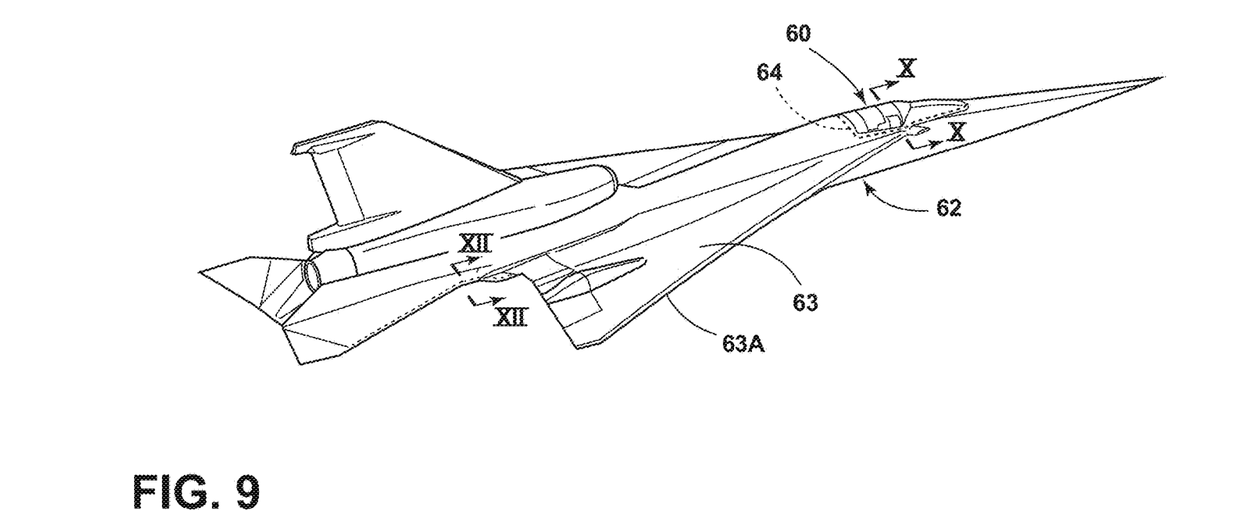
FIG. 9 is a partially schematic view of an aircraft including a cabin structure and primary structures that are fabricated utilizing BNNT mat material according to another aspect of the present disclosure.
Figure 10:
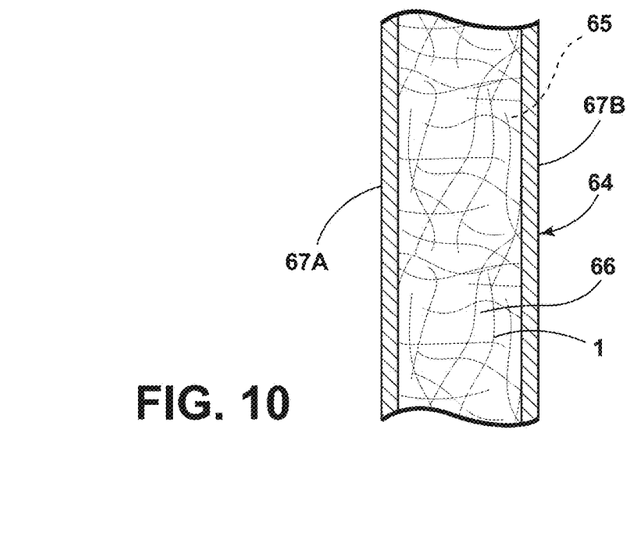
FIG. 10 is a cross sectional view of the aircraft of FIG. 9 taken along the line X-X.
Figure 11:
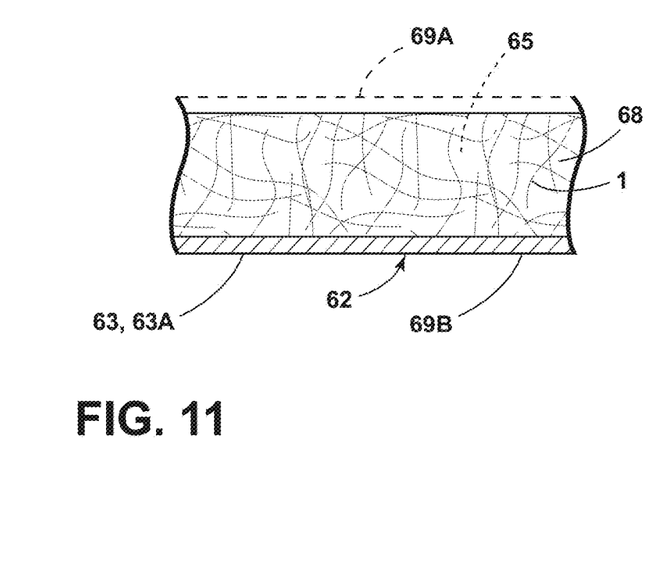
FIG. 11 is a cross sectional view of the aircraft of FIG. 9 taken along the line XI-XI.

With further reference to FIG. 9, an aircraft 60 includes a primary structure 62 and a cabin structure 64. With further reference to FIG. 10, the cabin structure 64 may include a core 66 comprising BNNT mat material 1. The cabin structure 64 may optionally include opposite outer layers 67A and 67B.

BNNT mat 1 may also be utilized to provide heat-resistance surface panels 63 and leading edges 63A of hypersonic vehicles. For example, with further reference to FIG. 11, primary structure 62 of aircraft 60 may include a core 68 comprising BNNT mat material 1, and optional outer layers 69A and 69B. The cores 66 and/or 68 of FIGS. 10 and 11 may comprise a non-composite BNNT mat 1. Alternatively, the cores 66 and/or 68 may comprise a composite material including BNNT mat 1 and 1 matrix material 65. Matrix material 65 may comprise a thermosetting polymer, or other suitable material.

With further reference to FIG. 12, fire protective clothing 74 for firefighters may also be fabricated utilizing BNNT mat material 1. The protective clothing 70 may comprise a single layer of BNNT mat material having a thickness of about 2 mm. The protective clothing 70 may optionally include outer layers on a first and/or second side of BNNT mat 1. The BNNT mat 1 of the present application may also be utilized in thermal protection systems/shelters as disclosed in U.S. Patent Publication No. 20160107412, the entire contents of which are incorporated herein. When the BNNT mat 1 is utilized as an outer layer of the fire protective clothing or shelters, the in-situ passivation due to formation of $B_2O_3$ protective layer and/or a refractory protective layer provide both thermal and gas barrier protection.

Figure 13:
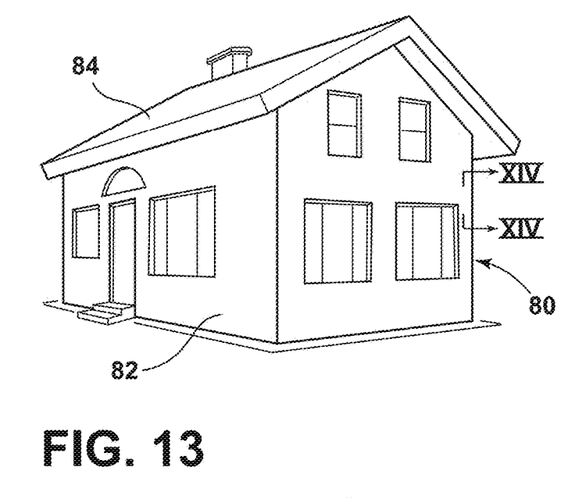
FIG. 13 is a partially schematic perspective view of a building structure including a BNNT mat material according to another aspect of the present disclosure.
Figure 14:
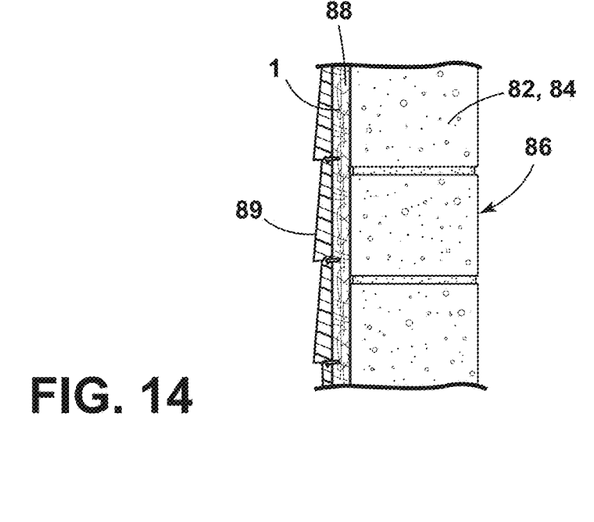
FIG. 14 is a cross sectional view of a portion of the building structure of FIG. 13 taken along the line XIV-XIV.

With further reference to FIGS. 13 and 14, a building structure 80 may include walls 82 and a roof 84. The wall 82 and/or roof 84 may include a primary structure 86 that is fabricated utilizing known construction materials such as wood, concrete, steel, or the like. The wall 82 and/or roof 84 may include an outer layer 88 comprising a BNNT mat material 1 according to the present disclosure. An optional exterior siding material 89 may be positioned over the layer 88 of BNNT mat material 1. The BNNT mat 1 reduces the flammability of the exterior of building structure 80.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." As used herein, the term "and/or" includes any and all combinations of one or more of the associated listed items. As also used herein, the term "combinations thereof" includes combinations having at least one of the associated listed items, wherein the combination can further include additional, like non-listed items. Further, the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

Reference throughout the specification to "another embodiment", "an embodiment", "exemplary embodiments", and so forth, means that a particular element (e.g., feature, structure, and/or characteristic) described in connection with the embodiment is included in at least one embodiment described herein, and can or cannot be present in other embodiments. In addition, it is to be understood that the described elements can be combined in any suitable manner in the various embodiments and are not limited to the specific combination in which they are discussed.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method of providing a thermal barrier, the method comprising:
positioning a layer of material comprising boron nitride nanotubes (BNNT) adjacent at least a portion of a surface to be shielded from thermal energy, wherein the layer of material further comprises elemental particles disposed in the BNNT adjacent to an outer exposed surface of the layer of material that is opposite the surface to be shielded from thermal energy, wherein the elemental particles react with the BNNT when the outer exposed surface of the layer of material is exposed to a high temperature gas or a thermal load greater than about 300 degrees Celsius during use to form a refractory material in a passivation and insulation sublayer of the layer of material during use, wherein the passivation and insulation sublayer formed during use is disposed adjacent to the outer exposed surface of the layer of material, and wherein the refractory material of the passivation and insulation sublayer comprises boron oxide, boron carbide, or boron oxide and boron carbide to provide 1) in-situ heat passivation, 2) a gas barrier, or 3) in-situ heat passivation and a gas barrier that minimizes transmission of heat and/or radiation further into the layer of material and into the surface to be shielded from thermal energy.

2. The method of claim 1, wherein the layer of material comprises a mat.

3. The method of claim 1, wherein the BNNT are configured to form a gas barrier when the layer of material is exposed to the high temperature gas.

4. The method of claim 1, wherein the layer of material comprises a BNNT mat having a thickness of about 0.5 mm to about 20 mm.

5. The method of claim 4, wherein the BNNT mat has a density of about 0.15 g/cm$^3$ to about 2.52 g/cm$^3$.

6. The method of claim 1, further comprising forming an inflatable structure from the layer of material.

7. The method of claim 1, further comprising utilizing front and back sides of the layer of material to manage a thermal load.

8. The method of claim 1, wherein the layer of material is fire resistant.

9. The method of claim 1, further comprising attaching the layer of material to a space vehicle to provide thermal shielding for atmospheric re-entry.

10. The method of claim 1, wherein the elemental particles comprise carbon particles.

11. The method of claim 1, wherein the elemental particles comprise titanium, hafnium, or nitrogen nanoparticles, or a combination thereof.

12. The method of claim 1, wherein the passivation and insulation sublayer is formed upon exposure of the layer of material to the high temperature during use.

13. A method of providing aerothermal shielding of a space vehicle during planetary re-entry and descent, the method comprising:
providing at least one layer of flexible aerothermal shielding material comprising a non-woven mat of boron nitride nanotubes (BNNT) including elemental particles disposed in the BNNT adjacent to an outer exposed surface of the layer of material, wherein the elemental particles react with the BNNT when the outer exposed surface of the layer of material is exposed to a high temperature gas or a thermal load greater than about 300 degrees Celsius to form a refractory material in a passivation and insulation sublayer of the layer of material, wherein the passivation and insulation sublayer is disposed adjacent to the outer exposed surface of the layer of material, and wherein the refractory material of the passivation and insulation sublayer comprises boron oxide, boron carbide, or boron oxide and boron carbide to provide aerothermal shielding that minimizes transmission of heat and/or radiation further into the layer of material;
forming a flexible thermal protection system (FTPS) from the non-woven mat of BNNT and elemental particles;
securing the FTPS to the space vehicle; and
configuring the FTPS to be deployed prior to or during planetary re-entry and descent of the space vehicle,
wherein in use the FTPS deploys with the outer exposed surface facing outward so that it is exposed to the high temperatures to form the insulation sublayer to minimize transmission of heat and/or radiation to the space vehicle.

14. The method of claim 13, wherein the non-woven mat of BNNT has a thickness of about 0.5 to about 20 mm.

15. The method of claim 13, wherein the non-woven mat of BNNT has a density of about 0.15 g/cm$^3$ to about 2.52 g/cm$^3$.

16. A method of providing a thermal barrier, the method comprising:
providing a layer of material comprising boron nitride tubes (BNNT); and
disposing elemental particles in the BNNT adjacent to first and second opposite surfaces of the layer of material,
wherein the elemental particles react with the BNNT when the layer of material is exposed to a high temperature gas or a thermal load greater than about 300 degrees Celsius during use to form a refractory material in first and opposite second passivation and insulation sublayers of the layer of material during use, wherein the first and second passivation and insulation sublayers are disposed adjacent to the respective first and second surfaces of the layer of material with a core sublayer of the material between them, and wherein the refractory material of the passivation and insulation sublayers comprises boron oxide, boron carbide, or boron oxide and boron carbide to provide 1) in-situ heat passivation, 2) a gas barrier, or 3) in-situ heat passivation and a gas barrier that minimizes transmission of heat and/or radiation through the layer of material.

17. The method of claim 16, wherein the refractory material comprises boron oxide.

18. The method of claim 16, wherein the refractory material comprises boron carbide.

19. The method of claim 16, wherein the refractory material comprises a ceramic.

20. The method of claim 16, wherein the layer of material comprises a mat.

* * * * *